(12) United States Patent
Yanan et al.

(10) Patent No.: US 9,315,688 B2
(45) Date of Patent: Apr. 19, 2016

(54) AQUEOUS SEALANT SYSTEM, WOOD PRODUCT AND METHOD FOR SEALING WOOD-BASED SUBSTRATE

(75) Inventors: Sha Yanan, Foshan (CN); Xie Xiaofang, Foshan (CN); Tang Guiming, Foshan (CN); Shi Chengfen, Foshan (CN); Duan Gang, Northbrook, IL (US)

(73) Assignee: VALSPAR SOURCING, INC., Minneapolis, MN (US)

( * ) Notice: Subject to any disclaimer, the term of this patent is extended or adjusted under 35 U.S.C. 154(b) by 18 days.

(21) Appl. No.: 13/639,695

(22) PCT Filed: Apr. 7, 2011

(86) PCT No.: PCT/IB2011/000766
§ 371 (c)(1),
(2), (4) Date: Dec. 17, 2012

(87) PCT Pub. No.: WO2011/124979
PCT Pub. Date: Oct. 13, 2011

(65) Prior Publication Data
US 2013/0196162 A1    Aug. 1, 2013

(30) Foreign Application Priority Data
Apr. 7, 2010    (CN) .......................... 2010 1 0142070

(51) Int. Cl.
| | |
|---|---|
| C09D 131/04 | (2006.01) |
| C09D 175/04 | (2006.01) |
| C08K 3/22 | (2006.01) |
| C09D 101/26 | (2006.01) |
| B05D 5/00 | (2006.01) |

(52) U.S. Cl.
CPC ................ C09D 131/04 (2013.01); C08K 3/22 (2013.01); C09D 101/26 (2013.01); C09D 175/04 (2013.01); Y10T 428/31551 (2015.04); Y10T 428/31591 (2015.04)

(58) Field of Classification Search
CPC .. C09D 131/04; C09D 175/04; C09D 101/26; C08K 3/22; C08K 3/0033; B05D 5/00
USPC ......... 428/425.1; 427/393; 524/507, 563, 430
See application file for complete search history.

(56) References Cited

U.S. PATENT DOCUMENTS

| | | | | |
|---|---|---|---|---|
| 4,396,738 | A | * | 8/1983 | Powell et al. ................... 524/228 |
| 4,491,646 | A | * | 1/1985 | Gruber et al. ................... 524/558 |
| 4,636,546 | A | | 1/1987 | Chao |
| 4,771,918 | A | | 9/1988 | Haggart |
| 6,113,989 | A | * | 9/2000 | Sinko ............................. 427/408 |
| 6,359,076 | B1 | | 3/2002 | Lunsford et al. |
| 2002/0040098 | A1 | * | 4/2002 | Maekawa et al. ................ 525/88 |
| 2002/0143101 | A1 | | 10/2002 | Probst et al. |
| 2002/0171170 | A1 | * | 11/2002 | DeMasi et al. ................. 264/255 |
| 2005/0196540 | A1 | | 9/2005 | Pepe et al. |
| 2007/0102108 | A1 | * | 5/2007 | Zheng et al. ................ 156/272.2 |
| 2009/0054579 | A1 | | 2/2009 | Nakamae |
| 2010/0015457 | A1 | * | 1/2010 | Johnson et al. ................ 428/500 |

FOREIGN PATENT DOCUMENTS

| | | |
|---|---|---|
| CN | 1458946 A | 11/2003 |
| CN | 1836862 A | 9/2006 |
| CN | 101125998 A | 2/2008 |
| FR | 2894507 A1 | 6/2007 |
| JP | 2000109629 A | 4/2000 |
| WO | 2007068826 A1 | 6/2007 |

OTHER PUBLICATIONS

Communication from European counterpart application No. 11718154.5-1301, dated Mar. 18, 2014, 3 pp.
International Search Report and Written Opinion of corresponding international application No. PCT/IB2011/000766, dated Mar. 2, 2012, 12 pp.
International Preliminary Report on Patentability of corresponding international application No. PCT/IB2011/000766, dated Sep. 9, 2012, 14 pp.
Reply to Written Opinion dated Mar. 2, 2012, from corresponding international application No. PCT/IB2011/000766, filed Jun. 1, 2012, 12 pp.
International Written Opinion of corresponding international application No. PCT/IB2011/000766, dated Jul. 26, 2012, 6 pp.
Reply to Second Written Opinion dated Jul. 26, 2012, from corresponding international application No. PCT/IB2011/000766, filed Aug. 24, 2012, 4 pp.
Office Action from the Canadian Intellectual Property Office for Canadian counterpart application No. 2,795,873 dated Sep. 13, 2013, 2 pp.
Response to Examination Report dated Mar. 18, 2014, from Counterpart European Application No. 11718154.5, Filed Sep. 19, 2014, 5 pp.
First Office Action and Search Report, and translation thereof, from counterpart Chinese Patent Application No. 201010142070.2, dated Jun. 4, 2014, 13 pp.
Second Office Action, and translation thereof, from counterpart Chinese Patent Application No. 201010142070.2, dated Nov. 26, 2014, 10 pp.
Response to Examination Report dated Jan. 27, 2015, from counterpart European Application No. 11718154.5, filed Aug. 6, 2015, 17 pp.
Examination Report from counterpart European Application No. 11718154.5-1301, dated Jan. 14, 2016, 5 pp.
Decision of Final Rejection and English Translation from counterpart Chinese Patent Application No. 201001420702, mailed Dec. 28, 2015, 9 pp.

* cited by examiner

Primary Examiner — Thao T Tran
(74) Attorney, Agent, or Firm — Shumaker & Sieffert, P.A.

(57) ABSTRACT

An aqueous sealant system, a wood product sealed by the aqueous sealant system, and a method for sealing a wood-based substrate. The aqueous sealant system includes: a) a film-forming resin composition including an aqueous latex of an active hydrogen-containing polymer, a filler, and optional additional additives; and b) a multi-isocyanate hardener, wherein the ratio by weight of the component a) to the component b) is 100:3 to 100:10.

16 Claims, No Drawings

AQUEOUS SEALANT SYSTEM, WOOD PRODUCT AND METHOD FOR SEALING WOOD-BASED SUBSTRATE

CROSS REFERENCE TO RELATED APPLICATIONS

This application claims the benefit of Chinese Application No. 201010142070.2, filed Apr. 7, 2010, as well as International application No. PCT/IB2011/00766, filed Apr. 7, 2011, which are each incorporated herein by reference in their entirety.

TECHNICAL FIELD

The present disclosure relates to an aqueous sealant system, and in particular, an aqueous sealant system for sealing a wood-based substrate such as a natural wood substrate or an artificial board substrate. Moreover, the present disclosure relates to a wood product sealed by the aqueous sealant system and a method for sealing a wood-based substrate with the aqueous sealant system.

BACKGROUND

In the manufacture of wood-based products, a sealant can be applied to a surface of the wood product to prevent colored compounds in a substrate of the wood product such as, for example, oils and tannins, from migrating up from the substrate to mar or otherwise discolor the surface. This migration of colored compounds may also contribute to and/or cause delamination of a coating overlying the substrate.

Customers have expressed a preference for aqueous latex sealants, which, in some embodiments, may be formulated to include small polymeric particles having good penetrability and water resistance. These latex particles can penetrate into capillaries or micropores in the surface and/or subsurface of the wood product to form a sealing layer or a coating. Aqueous latex sealants can, in some applications, have insufficient sealing or blocking properties to prevent colored compounds from migrating to a surface of a wood-based substrate. Some aqueous latex sealants can also be difficult and expensive to apply.

SUMMARY

There is still a need for an aqueous sealant system suitable for sealing a wood-based substrate, which has improved sealing or blocking performance, and can be produced in a simple manner at a relatively low cost.

In one aspect, the present disclosure is directed to an aqueous sealant system, including:
a) a film-forming resin composition including an aqueous latex of an active hydrogen-containing polymer, a filler, and optional additives; and
b) a multi-isocyanate hardener, wherein the ratio by weight of component a) to component b) is 100:3 to 100:10.

In another aspect, the present disclosure is directed to a wood product, including:
a wood based substrate; and
a seal coating on at least a part of the surface of the wood based substrate, wherein the seal coating is derived from an aqueous sealant system including
a) a film-forming resin composition including an aqueous latex of an active hydrogen-containing polymer, a filler, and optional additives; and
b) a multi-isocyanate hardener,
wherein the ratio by weight of component a) to component b) is 100:3 to 100:10.

In yet another aspect, the present disclosure is directed to a method for sealing a wood-based substrate, including:
applying to at least a part of the surface of the wood-based substrate an aqueous sealant system including
a) a film-forming resin composition including an aqueous latex of an active hydrogen-containing polymer, a filler, and optional additives; and
b) a multi-isocyanate hardener,
wherein the ratio by weight of component a) to component b) is 100:3 to 100:10; and
drying the aqueous sealant system to form a seal coating.

The aqueous sealant system described in this disclosure forms a seal coating having a three-dimensional network structure, which has excellent sealing or blocking performance. The aqueous sealant system also has excellent physical and chemical properties, such as non-stickiness, hardness, water resistance, and solvent resistance, as well as long-lasting sealing performance. Moreover, the aqueous sealant system can be produced in a simple manner at a relatively low cost.

DETAILED DESCRIPTION

In one aspect, the present disclosure is directed to an aqueous sealant system, including: a) a film-forming resin composition including an aqueous latex of an active hydrogen-containing polymer, a filler, and optional additional additives; and b) a multi-isocyanate hardener, wherein the ratio by weight of the component a) to the component b) is 100:3 to 100:10.

Throughout the description, the reference of the article, "a" or "an", includes the plural, unless specifically stated otherwise. Throughout the description, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited processing steps.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the term "a film-forming resin composition" refers to a resin composition that forms a major component of the seal coating to be formed from the aqueous sealant system, and which may include an aqueous latex of an active hydrogen-containing polymer, a filler, and optional additional additives.

As used herein, the term "an aqueous latex of a polymer" refers to a suspension of polymeric particles in water with the aid of, if necessary, an emulsifier and/or a dispersion stabilizer. The aqueous latex of a polymer may be produced, for example, through an emulsion polymerization process. Suitable emulsion polymerization processes are well known to a person skilled in the art, and generally include the steps of dispersing and emulsifying polymerizable monomers into water with the aid of, as appropriate, an emulsifier and/or a dispersion stabilizer under agitation; and initiating polymerization of the monomers, e.g., by adding a free-radical initiator.

The film-forming resin composition of the aqueous sealant system utilizes an aqueous latex of an active hydrogen-containing polymer. The active hydrogen is well known for its reactivity with an isocyanate group, and may be donated by many functional groups such as, for example, —COOH, —OH, —SH, secondary amino, and primary amino. Furthermore, some functional groups, e.g., an ester group (especially a carboxylic ester group), a thioether group, or an anhydride group (especially a carboxylic anhydride group), may be converted into the functional groups capable of offering active hydrogen, e.g., through hydrolysis. Therefore, as used herein, the term, "active hydrogen-containing polymer", unless specified otherwise, is intended to refer to any polymer originally containing functional groups capable of offering active hydrogen and/or any polymer containing functional groups which can be converted into any functional group capable of offering active hydrogen during the preparation and/or application of the aqueous sealant system. Examples of the latter include, but are not limited to, vinyl acetate-ethylene copolymers, vinyl acetate-ethylene-(meth)acrylate copolymers, vinyl acetate-(meth)acrylate copolymers, and polyvinyl acetate.

The aqueous latex of the active hydrogen-containing polymer is used to provide a resin component for the film-forming resin composition. This resin component functions as a binder which provides adhesion to a substrate for the seal coating and holds together other components, such as the filler, in the film-forming resin composition to impart basic cohesive strength to the seal coating. This resin component also has good reactivity with a multi-isocyanate hardener to achieve crosslinking of polymeric chains, which forms a three dimensional network structure in the seal coating.

Without wishing to be bound by any theory, presently available evidence indicates that the three-dimensional network structure formed by crosslinking the resin component substantially improves sealing or blocking performance. The active hydrogen has good reactivity with isocyanate groups, so that the three dimensional network structure can be developed at a desirable speed by setting the weight ratio of the film-forming resin composition to the multi-isocyanate hardener in a predetermined range of 100:3 to 100:10. The rapid development of the three dimensional network structure in the seal coating can rapidly prevent water-soluble tannins, plant oils, or other undesirable colored matter from migrating to the surface of the substrate and bleeding out. Moreover, the three dimensional network structure provides an aqueous sealant system with excellent physical and chemical properties, such as non-stickiness, hardness, water resistance, solvent resistance, and long-lasting sealing performance.

In one embodiment, the active hydrogen-containing polymer includes a polymer containing one or more of the following functional groups: —COOH, —OH, —SH, secondary amino, primary amino, an ester group (especially a carboxylic ester group), and an anhydride group (especially a carboxylic anhydride group). In another embodiment, the active hydrogen-containing polymer includes a polymer containing structural units of Formula I:

$$—CH_2—CH(OR)—$$ (I)

wherein R represents hydrogen or —C(O)—CH$_3$.

In a preferred embodiment, the active hydrogen-containing polymer includes one or more of a vinyl acetate-ethylene copolymer, a vinyl acetate-ethylene-(meth)acrylate copolymer, a vinyl acetate-(meth)acrylate copolymer, polyvinyl acetate, or polyvinyl alcohol, or any combination thereof. In a particularly preferred embodiment, the active hydrogen-containing polymer may be a vinyl acetate-ethylene copolymer.

Preferably, the film-forming resin composition includes the aqueous latex of the active hydrogen-containing polymer in amount of about 20 to about 55% by weight, preferably about 35 to about 55% by weight, based on the total weight of the film-forming resin composition. In particular, the film-forming resin composition may include the aqueous latex of the active hydrogen-containing polymer in an amount of about 25, 30, 35, 40, 45, or 50% by weight, based on the total weight of the film-forming resin composition.

In a preferred embodiment, the aqueous latex of the active hydrogen-containing polymer has a solid content in the range of about 20% to about 60%, preferably about 45% to about 60%, wherein the solid content is calculated as the percentage of the weight of the active hydrogen-containing polymer relative to the total weight of the active hydrogen-containing polymer plus water. In particular, the aqueous latex of active hydrogen-containing polymer has a solid content of about 22.5, 25.0, 27.5, 30.0, 32.5, 35.0, 37.5, 40.0, 42.5, 45.0, 47.5, 50.0, 52.5, 55.0, or 57.5%. In an embodiment, the aqueous latex of the active hydrogen-containing polymer has a pH value in the range of about 4.2 to about 8.0.

The aqueous latex of the active hydrogen-containing polymer can be prepared by a suitable emulsion polymerization process. Alternatively, any suitable commercially available product may be used, such as those available under the trade designation Vinnapas 402 from Wacker Chemie AG, Germany and those available under the trade designation Celvolit 1602 from Celanese Corporation, US.

Suitable film-forming resin compositions preferably further include one or more fillers. As used herein, the term, "filler" refers to any volume extender, either organic or inorganic, in the form of e.g., particles. The particle size of the filler may vary over a broad range, e.g., from about 50 micrometers to about 10 nanometers. Suitable illustrative fillers, for example, include, but are not limited to, talc, calcium carbonate, barium sulfate, magnesium aluminum silicate, silica, or any combination thereof. In a preferred embodiment, as the filler, magnesium aluminum silicate having high transparency is used.

The amount of the filler used in the film-forming resin composition may vary over a broad range. Preferably, the film-forming resin composition includes the filler in an amount of about 20 to about 70% by weight, preferably about 40 to about 65% by weight, based on the total weight of the film-forming resin composition. In particular, the film-forming resin composition may include the filler in amount of about 25, 30, 35, 45, 50, 55, or 60% by weight, based on the total weight of the film-forming resin composition.

In an embodiment, the film-forming resin composition may further include additional additives such as, for example one or more of wetting and dispersing agents, defoamers, thickeners, or pigments, or any combination thereof.

Suitable wetting and dispersing agents may include an ionic wetting and dispersing agent, a non-ionic wetting and dispersing agent, or a multifunctional wetting and dispersing agent. Suitable examples of the ionic wetting and dispersing agent include those available under the trade designation Dispers 715W from Tego Corporation, Germany. Suitable examples of the non-ionic wetting and dispersing agent include those available under the trade designation Dispers 740W from Tego Corporation, Germany. Suitable examples of the multifunctional wetting and dispersing agent include those available under the trade designation Dispers 760W from Tego Corporation, Germany.

In a preferred embodiment, the film-forming resin composition includes the wetting and dispersing agent in amount of about 0.3 to about 15% by weight, preferably about 0.3 to about 0.5% by weight, based on the total weight of the film-forming resin composition. In particular, the film-forming resin composition may include the wetting and dispersing agent in an amount of about 0.35, 0.4, 0.45, 0.6, 0.8, 1.0, 2.0, 5.0, 10, or 13% by weight, based on the total weight of the film-forming resin composition.

Suitable defoamers include, but are not limited to, organic siloxane defoamers, polyether defoamers, polyether modified organic silicone defoamers, or any combination thereof. As an example of the organic siloxane defoamer, those available under the trade designation BYK 024 from BYK Corporation, Germany, can be used. As an example of the polyether defoamer, those available under the trade designation BYK 1660 from BYK Corporation, Germany, can be used. As an example of the polyether modified organic silicone defoamer, those available under the trade designation TEGO Foamex 810 from EVONIK Corporation, can be used.

In a preferred embodiment, the film-forming resin composition includes the defoamer in amount of about 0.3 to about 15% by weight, preferably about 0.3 to about 0.6% by weight, based on the total weight of the film-forming resin composition. In particular, the film-forming resin composition may include the defoamer in amount of about 0.35, 0.4, 0.45, 0.5, 0.55, 0.7, 0.8, 1.0, 2, 5, 10, or 13% by weight, based on the total weight of the film-forming resin composition.

Suitable thickeners include, but are not limited to, polyurethane thickeners, cellulose ether thickeners, or any combination thereof. As an example of the polyurethane thickener, those available under the trade designation RM-8W thickener from Rohm & Hass Corporation, US, can be used. As an example of the cellulose ether thickener, those available under the trade designation Bermocoll EBS 451 FQ from Akzo Nobel Corporation, the Netherlands, can be used.

In a preferred embodiment, the film-forming resin composition includes the thickener in amount of about 0.3 to about 15% by weight, preferably about 0.5 to about 1.5% by weight, based on the total weight of the film-forming resin composition. In particular, the film-forming resin composition may include the thickener in amount of about 0.4, 0.6, 0.7, 0.8, 0.9, 1.0, 1.1, 1.2, 1.3, 1.4, 2.0, 3, 4, 5, 8, 10, 12, or 14% by weight, based on the total weight of the film-forming resin composition.

Suitable pigments may include, for example, depending on the desired color of the seal coating, one or more of iron oxides, carbon blacks, lead oxides, lead carbonates, zinc oxide, titanium oxide, ultra-marine blue, chrome green, or chromium oxide, or any combination thereof.

In a preferred embodiment, titanium oxide is used as a pigment.

In a preferred embodiment, the film-forming resin composition includes the pigment in amount of up to about 15% by weight, based on the total weight of the film-forming resin composition. In particular, the film-forming resin composition may include the pigment in amount of about 1, 2, 3, 4, 5, 6, 7, 8, 9, 10, 11, 12, 13, or 14% by weight, based on the total weight of the film-forming resin composition.

The film-forming resin composition may be prepared using any suitable compounding process. For example, the film-forming resin composition may be prepared by adding the aqueous latex, filler, and if any, additional additives, into a vessel, and agitating the resulting mixture until it is substantially homogeneous. Additional water may be added, as appropriate, during the preparation of the film-forming resin composition, and the amount of the additional water shall be added into the total weight of the aqueous latex.

As used herein, the term "a multi-isocyanate hardener" refers to a multi-isocyanate compound, an isocyanate prepolymer, or a combination thereof. The multi-isocyanate hardener has two or more isocyanate functionalities, and is capable of reacting with the active hydrogen-containing polymer to achieve chain extension and crosslinking, which forms the three-dimensional network structure in the seal coating.

Suitable multi-isocyanate hardeners include, but are not limited to, aliphatic multi-isocyanates, aromatic multi-isocyanates, or any combination thereof. As used herein, the term "aliphatic multi-isocyanates" refers to any multi-isocyanate compound having isocyanate groups directly attached to an aliphatic chain or ring. As used herein, the term "aromatic multi-isocyanates" refers to any multi-isocyanate compound having isocyanate groups directly attached to an aromatic ring.

Suitable multi-isocyanate compounds, include, but are not limited to, hexamethylene diisocyanate, dodecamethylene diisocyanate, cyclohexene-1,4-diisocyanate, 4,4'-dicyclohexene methane diisocyanate, cyclopentene-1,3-diisocyanate, p-phenylene diisocyanate, toluene-2,4-diisocyanate, naphthalene-1,4-diisocyanate, diphenyl-4,4'-diisocyanate, benzene-1,2,4-triisocyanate, xylylene-1,4-diisocyanate, xylylene-1,3-diisocyanate, diphenylene methane diisocyanate, butane-1,2,3-triisocyanate, or polymethylene polyphenyl isocyanate.

As examples of a suitable isocyanate prepolymer, polyurethane based prepolymers of any of the multi-isocyanate compounds above, polyester based prepolymers of any of the multi-isocyanate compounds above, and polyether based prepolymers of any of the multi-isocyanate compounds above can be used. The polyurethane based prepolymer, the polyester based prepolymer or the polyether based prepolymer may be prepared by any suitable method. For example, the polyurethane based prepolymer may be prepared by reacting a monomeric polyol with one or more of the multi-isocyanate compounds under suitable conditions; the polyester based prepolymer or the polyether based prepolymer may be prepared by reacting polyester polyol or polyether polyol with one or more of the multi-isocyanate compounds under suitable conditions. Alternatively, as the polyurethane based prepolymer, the polyester based prepolymer or the polyether based prepolymer, any suitable commercial available product can be used, for example, those available under the trade designation BAYTEC ME 120 or BAYTEC ME 230 from Bayer, Germany.

In a preferred embodiment, the multi-isocyanate hardener may be diphenyl methane diisocyanate monomer, polymethylene polyphenyl isocyanate, polyether based diphenyl methane diisocyanate prepolymer, polyester based diphenyl methane diisocyanate prepolymer, or any combination thereof. In a further preferred embodiment, polymethylene polyphenyl isocyanate, polyether based diphenyl methane diisocyanate prepolymer or polyester based diphenyl methane diisocyanate prepolymer may be used.

The weight ratio of the film-forming resin composition to the multi-isocyanate hardener is within the range of 100:3 to 100:10. In particular, the weight ratio of the film-forming resin composition to the multi-isocyanate hardener may be 100:3.5, 100:4, 100:5, 100:6, 100:7, 100:8, or 100:9. In general, when the weight ratio of the film-forming resin composition to the multi-isocyanate hardener is less than 100:3, then the improvement in the sealing performance of the resulting seal coating can in some cases be insufficient. In general, when the weight ratio of the film-forming resin composition to the multi-isocyanate hardener is greater than 100:10, then the operability of the sealant system and/or the mechanical properties of the resulting seal coating may in some cases be degraded.

In a further preferred embodiment, the aqueous sealant system may further include an antifreeze agent, a bactericide, a biocide, a pH adjuster, or any combination thereof. The amount of the antifreeze agent, the bactericide, the biocide and/or the pH adjuster, if added, is added into the total weight of the film-forming resin composition.

In an embodiment, a suitable antifreeze agent such as, for example, propylene glycol or ethylene glycol, preferably ethylene glycol, can be used.

In an embodiment, a suitable bactericide may be used such as, for example, aqueous chloromethyl isothiazolinone, aqueous methyl isothiazolinone, bromo-nitro-propylene glycol, or any combination thereof.

In an embodiment, a suitable pH adjuster may be used such as, for example, aqueous ammonia, triethyl amine, alkylol amine, or any combination thereof, preferably alkylol amine. As an example of alkylol amine, those available under the trade designation AMP-95 from DOW Corporation, US, can be used.

In an embodiment, the aqueous sealant system may include the antifreeze agent in an amount of about 1 to about 3% by weight, based on the total weight of the film-forming composition. In an embodiment, the aqueous sealant system may include the bactericide in an amount of about 0.1 to about 0.3% by weight, based on the total weight of the film-forming resin composition. In an embodiment, the aqueous sealant system may include the biocide in an amount of about 0.1 to about 0.3% by weight, based on the total weight of the film-forming resin composition. In an embodiment, the aqueous sealant system may include the pH adjuster in an amount of about 0.1-about 0.3% by weight, based on the total weight of the film-forming resin composition.

In some embodiments, the aqueous sealant system may be prepared by simply mixing the film-forming resin composition and the multi-isocyanate hardener in a predetermined weight ratio prior to application. For example, the aqueous sealant system may be applied by using a disperser such as a spray gun, which is provided with at least two load chambers and a mixing chamber. In this case, the film-forming resin composition and the multi-isocyanate hardener may be separately charged into the different load chambers, and mixed in the mixing chamber in a predetermined weight ratio prior to application. Alternatively, the aqueous sealant system may be applied in a wet-on-wet manner, in which the film-forming resin composition is first applied onto a surface of a wood-based substrate, and thereafter, the multi-isocyanate hardener is applied in a predetermined weight ratio onto the wet film of the film-forming resin composition.

In an embodiment, the aqueous sealant system includes: a) a film-forming resin composition; and b) a multi-isocyanate hardener, wherein the component a) includes, based on the total weight of the component a), 20 to 55% by weight of the aqueous latex of the active hydrogen-containing polymer; 20 to 70% by weight of the filler; and 0 to 25% by weight of the additional additives such as one or more of wetting and dispersing agents, defoamers, thickeners, or pigments, or any combination thereof, and wherein the ratio by weight of the component a) to the component b) is in the range of 100:3 to 100:10.

In an embodiment, the aqueous sealant system includes: a) a film-forming resin composition; and b) a multi-isocyanate hardener, wherein the component a) includes, based on the total weight of the component a), 20 to 50% by weight of the aqueous latex of the active hydrogen-containing polymer; 40 to 65% by weight of the filler; and 0.3 to 0.5% by weight of the wetting and dispersing agent; 0.3 to 0.6% by weight of the defoamer; 0.5 to 1.5% by weight of the thickener; and 0 to 15% by weight of the pigment, and wherein the ratio by weight of the component a) to the component b) is in the range of 100:3 to 100:10.

In an embodiment, the aqueous sealant system includes: a) a film-forming resin composition; and b) a multi-isocyanate hardener, wherein the component a) includes, based on the total weight of the component a), 35 to 55% by weight of the aqueous latex of the active hydrogen-containing polymer; 40 to 65% by weight of the filler; and 0.3 to 15 by weight of the additional additives including one or more of wetting and dispersing agents, defoamers, thickeners, or pigments, or any combination thereof, and wherein the ratio by weight of the component a) to the component b) is in the range of 100:3 to 100:10.

In an embodiment, the aqueous sealant system may further include, based on the total weight of the film-forming composition, 1 to 3% by weight of the antifreeze agent; 0.1 to 0.3% by weight of the bactericide; 0.1 to 0.3% by weight of the biocide; and 0.1 to 0.3% by weight of the pH adjuster.

In another aspect, the present disclosure is directed to a wood product, including: a wood based substrate; and a seal coating on at least a part of the surface of the wood based substrate, wherein the seal coating is derived from the aqueous sealant system described above.

In a preferred embodiment, the wood based substrate may be a natural wood substrate, an artificial board substrate, or any combination thereof.

In still another embodiment, the present disclosure is directed to a method for sealing a wood-based substrate, including applying the aqueous sealant system described above onto at least a part of the surface of the wood-based substrate; and drying the aqueous sealant system to form a seal coating.

In a preferred embodiment, the wood based substrate may be a natural wood substrate, an artificial board substrate, or any combination thereof.

In particular, the aqueous sealant system is preferably used to seal a substrate of tannin- and/or plant oil-enriched wood, including, but not limited to, oak, chestnut, cherry, basswood, cedar, teak, rosewoods, redwood, Korean pine, and any scarred wood. For example, the tannin-enriched wood preferably has a tannin content of not lower than 4%, more preferably not lower than 5%, even up to 30%, and in particular 4-12% or 5-12%, relative to the total content of extractable solids in the wood.

The artificial board substrate may be selected from, for example, medium density (MD) fiberboard, plywood, oriented strand board, particle board, or hard fiberboard.

The present invention is further illustrated by the following examples, which are not to be construed in any way as imposing limitations upon the scope thereof.

EXAMPLES

The materials used in the examples are listed in Table 1 below.

TABLE 1

| No. | Name | Producer | Description |
|---|---|---|---|
| 1 | Vinnapas 420 | Wacker Chemie AG, Germany | Aqueous VAE (vinyl acetate-co-ethylene) latex, with a solid content of 45-60% |
| 2 | MJ-2000 | Jinhou Chemicals, China | MgAl silicate filler |
| 3 | Dispers 760W | Tego, Germany | Wetting and dispersing agent |
| 4 | BYK 024 | BYK, Germany | Defoamer |
| 5 | RM-8W | Romh & Hass, US | Thickener |
| 6 | R-706 | DuPont, US | Pigment |
| 7 | Ethylene Glycol | Dow, US | Anti-freeze agent |
| 8 | LXE | Romh & Hass, US | Bactericide |
| 9 | AMP-95 | Dow, US | pH adjuster |
| 10 | PAPI 27 | Dow, USA | Polymethylene polyphenyl isocyanate hardener |

Example 1

Preparation of Film-Forming Resin Composition 20 kg Vinnapas 420, 0.4 kg Dispers 760W, 0.5 kg BYK 024, 3 kg ethylene glycol, 16.4 kg water, and 0.2 kg bactericide were added and mixed in a vessel, and agitated at 300-600 rpm until homogeneous. Then into the mixture 2 kg R-706, 58 kg MJ-2000, and 0.5 kg RM-8W were added under agitation. The resulting mixture was agitated for 15-20 min, after which the pH adjuster AMP-95 was slowly added dropwise to adjust the pH value of the mixture to 7-9. As a result, the film-forming resin composition was obtained.

Preparation of Aqueous Sealant System

The thus-prepared film-forming resin composition was homogenously mixed with PAPI 27 in a ratio by weight of 100:9 immediately before use.

Application and Evaluation of Aqueous Sealant System

Two oak wood panels, each 40 cm×60 cm, were sanded by using 400-grit sandpaper to remove any stains, burrs, and dust from the surfaces of the panels, and stood ready for use.

The aqueous sealant system was applied onto the sanded surface of one of the panels, and dried for 2 hours at room temperature to form a seal coating. The seal coating was sanded by using 600-grit sandpaper, after which a white-colored aqueous acrylic latex primer was applied onto the seal coating.

As a comparative experiment, the same white-colored aqueous acrylic latex primer was directly applied onto the sanded surface of the other panel.

After one week, no visual discoloration was observed in the white-colored primer overlying the seal coating, while visual yellowing, which was believed to be caused by the natural colored matters in the oak, was observed in the white-colored primer in the comparative experiment. It was found that the seal coating exhibited superior sealing performance against the natural coloring matters in the oak wood.

Example 2

Preparation of Film-Forming Resin Composition 20 kg Vinnapas 420, 0.4 kg Dispers 760W, 0.5 kg BYK 024, 3 kg ethylene glycol, 16.4 kg water, and 0.2 kg bactericide were added and mixed in a vessel, and agitated at 300-600 rpm until homogeneous. Then into the mixture 2 kg R-706, 58 kg MJ-2000, and 0.5 kg RM-8W were added under agitation. The resulting mixture was agitated for 15-20 min, after which the pH adjuster AMP-95 was slowly added dropwise to adjust the pH value of the mixture to 7-9. As a result, the film-forming resin composition was obtained.

Preparation of Aqueous Sealant System

The thus-prepared film-forming resin composition was homogenously mixed with PAPI 27 in a ratio by weight of 100:5 immediately before use.

Application and Evaluation of Aqueous Sealant System

Two oak wood panels, each 40 cm×60 cm, were sanded by using 400-grit sandpaper to remove any stains, burrs, and dust from the surfaces of the panels. The sanded surfaces of the panels were colored by using a black water-based ink pen, and dried at room temperature for 2 hours.

The aqueous sealant system was applied onto the colored surface of one of the panels, and dried at room temperature for 2 hours to form a seal coating. The seal coating was sanded by using 600-grit sandpaper, after which a white-colored aqueous acrylic latex topcoat was applied onto the seal coating.

As a comparative experiment, a white-colored aqueous acrylic latex primer was directly applied onto the colored surface of the other panel, dried and sanded, after which the same topcoat was applied onto the primed surface of the other panel.

After one week, no visual discoloration was observed in the topcoat overlying the seal coating, while visual dark discoloration, which was believed to be caused by the migration of the black dye from the pen ink, was observed in the topcoat in the comparative experiment. It was found that the seal coating exhibited superior sealing performance against the artificially added dye.

It was found that when a black oil-based ink pen was used instead of the black water-based ink pen, a similar result was obtained.

Example 3

Preparation of Film-Forming Resin Composition 20 kg Vinnapas 420, 0.4 kg Dispers 760W, 0.5 kg BYK 024, 3 kg ethylene glycol, 16.4 kg water, and 0.2 kg bactericide were added and mixed in a vessel, and agitated at 300-600 rpm until homogeneous. Then into the mixture 2 kg R-706, 58 kg MJ-2000, and 0.5 kg RM-8W were added under agitation. The resulting mixture was agitated for 15-20 min, after which the pH adjuster AMP-95 was slowly added dropwise to adjust the pH value of the mixture to 7-9. As a result, the film-forming resin composition was obtained.

Preparation of Aqueous Sealant System

The thus-prepared film-forming resin composition was homogenously mixed with PAPI 27 in a ratio by weight of 100:3.5 immediately before use.

Application and Evaluation of Aqueous Sealant System

Two scarred pine wood panels, each 10 cm×20 cm, were sanded by using 400-grit sandpaper to remove any stains, burrs, and dust from the surfaces of the panels, and stood ready for use.

The aqueous sealant system was applied onto the sanded surface of one of the panels, and dried at room temperature for 2 hours to form a seal coating. The seal coating was sanded by using 600-grit sandpaper, after which a white-colored aqueous acrylic latex topcoat was applied onto the seal coating.

As a comparative experiment, a white-colored aqueous acrylic latex primer was directly applied onto the sanded surface of the other panel, dried and sanded, after which the same topcoat was applied onto the primed surface of the other panel.

After coating with the topcoat, the two scarred pine wood panels were stored at room temperature for 6 hours, followed by drying in an oven at 50° C. for 7 hours. After removal from the oven, no visual discoloration or bleeding-out of oily matter was observed in the topcoat overlying the seal coating, while bleeding-out of oily matter and also visual yellowing, which was believed to be caused by the tannins contained in the pine, was observed in the topcoat in the comparative experiment. It was found that the seal coating exhibited superior sealing performance against the tannins and plant oil in the scarred pine wood.

Example 4

Preparation of Film-Forming Resin Composition 20 kg Vinnapas 420, 0.4 kg Dispers 760W, 0.5 kg BYK 024, 3 kg ethylene glycol, 16.4 kg water, and 0.2 kg bactericide were added and mixed in a vessel, and agitated at 300-600 rpm. Then into the mixture 2 kg R-706, 58 kg MJ-2000, and 0.5 kg RM-8W were added under agitation until homogeneous. The resulting mixture was agitated for 15-20 min, after which the pH adjuster AMP-95 was slowly added dropwise to adjust the pH value of the mixture to 7-9. As a result, the film-forming resin composition was obtained.

Preparation of Aqueous Sealant System

The thus-prepared film-forming resin composition was homogenously mixed with PAPI 27 in a ratio by weight of 100:3.5 immediately before use.

Application and Evaluation of Aqueous Sealant System

Two MD fiber boards, each 40 cm×60 cm, were sanded by using 400-grit sandpaper to remove any stains, burrs, and dust from the surfaces of the fiber boards, and stood ready for use.

The aqueous sealant system was applied onto the sanded surface of one of the fiberboards, and dried at room temperature for 2 hours to form a seal coating. The seal coating was sanded by using 600-grit sandpaper, after which a white-colored aqueous acrylic latex topcoat was applied onto the seal coating.

As a comparative experiment, a white-colored aqueous acrylic latex primer was directly applied onto the sanded surface of the other fiberboard, dried and sanded, after which the same topcoat was applied onto the primed surface of the other fiberboard.

After 24 hours from application of the topcoat, the migration of fiber into the topcoat was observed in the comparative experiment. After one week from application of the topcoat, visual yellowing, which was believed to be caused by a yellow dye often added in the MD fiber board, was observed in the topcoat in the comparative experiment. To the contrary, no migration of fiber or yellowing was observed in the topcoat overlying the seal coating. It was found that the seal coating exhibited superior sealing against the undesirable substance and coloring matter in the artificial board substrate.

Example 5

Preparation of Film-Forming Resin Composition 20 kg Vinnapas 420, 0.4 kg Dispers 760W, 0.5 kg BYK 024, 3 kg ethylene glycol, 16.4 kg water, and 0.2 kg bactericide were added and mixed in a vessel, and agitated at 300-600 rpm until homogeneous. Then into the mixture 2 kg R-706, 58 kg MJ-2000, and 0.5 kg RM-8W were added under agitation. The resulting mixture was agitated for 15-20 min, after which the pH adjuster AMP-95 was slowly added dropwise to adjust the pH value of the mixture to 7-9. As a result, the film-forming resin composition was obtained.

Preparation of Aqueous Sealant System

The thus-prepared film-forming resin composition was homogenously mixed with PAPI 27 in a ratio by weight of 100:3.5 immediately before use.

Application and Evaluation of Aqueous Sealant System

Two oak wood panels, each 40 cm×60 cm, were sanded by using 400-grit sandpaper to remove any stains, burrs, and dust from the surfaces of the panels, and stood ready for use.

The aqueous sealant system was applied onto the sanded surface of one of the panels, and dried for 2 hours at room temperature to form a seal coating. The seal coating was sanded by using 600-mesh sandpaper, after which a white-colored aqueous acrylic latex primer was applied onto the seal coating.

As a comparative experiment, the film-forming resin composition as prepared was applied onto the sanded surface of the other panel without addition of the multi-isocyanate hardener. Thereafter, the same white-colored aqueous acrylic latex primer was applied onto the seal coating formed from the film-forming resin composition alone.

After one week, no visual discoloration was observed in the white-colored primer overlying the seal coating obtained from the aqueous sealant system including the film-forming resin composition in combination with the multi-isocyanate hardener, while visual yellowing, which was believed to be caused by the natural colored matter in oak, was observed in the white-colored primer in the comparative experiment. It was found that the seal coating that was obtained from the aqueous sealant system including the film-forming resin composition in combination with the multi-isocyanate hardener exhibited superior sealing performance against the natural colored matters in the oak wood.

While the invention has been described with respect to a number of embodiments and examples, those skilled in the art, having benefit of this disclosure, will appreciate that other embodiments can be devised which do not depart from the scope and spirit of the invention as disclosed herein.

The invention claimed is:

1. A method for sealing a wood substrate, comprising:
    (1) applying an aqueous sealant system onto at least a part of the surface of the wood substrate, wherein the wood substrate comprises has a tannin content of not lower than 5% and up to 30%, relative to the total content of extractable solids in the wood, and wherein the aqueous sealant system comprises:
        a) a film-forming resin composition comprising an aqueous latex of an active hydrogen-containing polymer, a filter, and optional additives, wherein the active-hydrogen-containing polymer comprises one or more of a vinyl acetate-ethylene copolymer, a vinyl acetate-ethylene-(meth)acrylate copolymer, a vinyl acetate-(meth)acrylate copolymer, polyvinyl acetate, or polyvinyl alchohol; and
        b) a multi-isocyanate hardener,
    wherein the ratio by weight of component a) to component b) is 100:3 to 100:10; and
    (2) drying the aqueous sealant system to form a seal coating on the surface of the wood substrate, wherein the seal coating prevents migration of tannins in the wood to the surface of the wood substrate.

2. The method according to claim 1, further comprising applying a topcoat on the seal coating.

3. The method according to claim 1, wherein the wood is selected from the group consisting of oak, chestnut, cherry, basswood, cedar, teak, rosewood, redwood, Korean pine and scarred wood.

4. The method according to claim 1, wherein component a) comprises, based on the total weight of component a),
- 20 to 55% by weight of the aqueous latex of the active hydrogen-containing polymer;
- 20 to 70% by weight of the filler; and
- 0 to 25% by weight of an additional additive, wherein the additive comprises one or more of wetting and dispersing agents, defoamers, thickeners, and pigments.

5. The method according to claim 4, wherein component a) comprises, based on the total weight of the component a),
- 35 to 55% by weight of the aqueous latex of active hydrogen-containing polymer;
- 40 to 65% by weight of the filler; and
- 0.3 to 15% by weight of the additional additives.

6. The method according to claim 4, wherein the wetting and dispersing agent comprises one or more of an ionic wetting and dispersing agent, a non-ionic wetting and dispersing agent, and a multifunctional wetting and dispersing agent.

7. The method according to claim 4, wherein the defoamer further comprises one or more of an organic siloxane defoamer, and a polyether modified organic silicone defoamer.

8. The method according to claim 4, wherein the thickener comprises one or more of polyurethane thickener and a cellulose ether thickener.

9. The method according to claim 4, wherein the pigment comprises one or more of iron oxides, carbon black, lead oxides, lead carbonates, zinc oxide, titanium oxide, ultramarine blue, chrome green, and chromium oxide.

10. The method according to claim 4, wherein component a) comprises, based on the total weight of component a),
- 20 to 50% by weight of the aqueous latex of the active hydrogen-containing polymer;
- 40 to 65% by weight of the filler;
- 0.3 to 0.5% by weight of the wetting and dispersing agent;
- 0.3 to 0.6% by weight of the defoamer;
- 0.5 to 1.5% by weight of the thickener; and
- 0 to 15% by weight of the pigment.

11. The method according to claim 10, further comprising, based on the total weight of component a),
- 1 to 3% by weight of an antifreeze agent;
- 0.1 to 0.3% by weight of a bactericide;
- 0.1 to 0.3% by weight of a biocide; and
- 0.1 to 0.3% by weight of pH adjuster.

12. The method according to claim 1, wherein the aqueous latex of the active hydrogen-containing polymer has a solid content in the range of 45% to 60% based on the weight of the polymer to the combination of the polymer plus water, and a pH value in the range of 4.2-8.0.

13. The method according to claim 1, wherein component b) comprises one or more of aliphatic multi-isocyanate, or aromatic multi-isocyanate, or any combination thereof.

14. The method according to claim 13, wherein component b) comprises one or more of hexamethylene diisocyanate, dodecamethylene diisocyanate, cyclohexene-1,4-diisocyanate, 4,4'-dicyclohexene methane diisocyanate, cyclopentene-1,3-diisocyanate, p-phenylene diisocyanate, toluene-2,4-diisocyanate, naphthalene-1,4-diisocyanate, diphenyl-4,4'-diisocyanate, benzene-1,2,4-triisocyanate, xylylene-1,4-diisocyanate, xylylene-1,3-diisocyanate, diphenylene methane diisocyanate, butane-1,2,3-triisocyanate, polymethylene polyphenyl isocyanate, polyurethane based prepolymer thereof, polyester based prepolymer thereof, or polyether based prepolymer thereof, or any combination thereof.

15. The method according to claim 13, wherein component b) comprises one or more of diphenyl methane diisocyanate monomer, polyether based diphenyl methane diisocyanate prepolymer, or polyester based diphenyl methane diisocyanate prepolymer, or any combination thereof.

16. The method according to claim 1, wherein the filler comprises one or more of talc, calcium carbonate, barium sulfate, magnesium aluminum silicate, and silica.

* * * * *